United States Patent [19]
Atkins

[11] 3,728,705
[45] Apr. 17, 1973

[54] LAMP OUTAGE INDICATOR

[75] Inventor: Carl E. Atkins, Montclair, N.J.

[73] Assignee: Wagner Electric Corporation

[22] Filed: May 4, 1970

[21] Appl. No.: 34,497

Related U.S. Application Data

[63] Continuation-in-part of Ser. No. 591,529, Dec. 12, 1966, abandoned.

[52] U.S. Cl....................340/251, 315/82, 340/52 R
[51] Int. Cl............................................G08b 21/00
[58] Field of Search.....................340/251, 256, 237, 340/244 C, 248, 253; 307/318; 315/82, 83, 135; 250/214 D; 317/148.5 B

[56] References Cited

UNITED STATES PATENTS

| | | | |
|---|---|---|---|
| 3,289,194 | 11/1966 | King | 340/256 X |
| 3,376,431 | 4/1968 | Merrell | 307/318 X |
| 3,320,493 | 5/1967 | Culbertson | 307/318 X |
| 3,333,258 | 7/1967 | Walker et al. | 340/244 C |
| 3,206,615 | 9/1965 | LaPointe | 317/148.5 B |
| 3,303,346 | 2/1967 | Atkins et al. | 250/214 D |

Primary Examiner—Thomas B. Habecker
Assistant Examiner—Daniel Myer
Attorney—Eyre, Mann & Lucas

[57] ABSTRACT

A monitoring circuit wherein a change in the electrical load in an automobile lamp circuit causes the output of a sensing amplifier to increase and actuate a control switch that lights an indicator to show the change in load.

8 Claims, 3 Drawing Figures

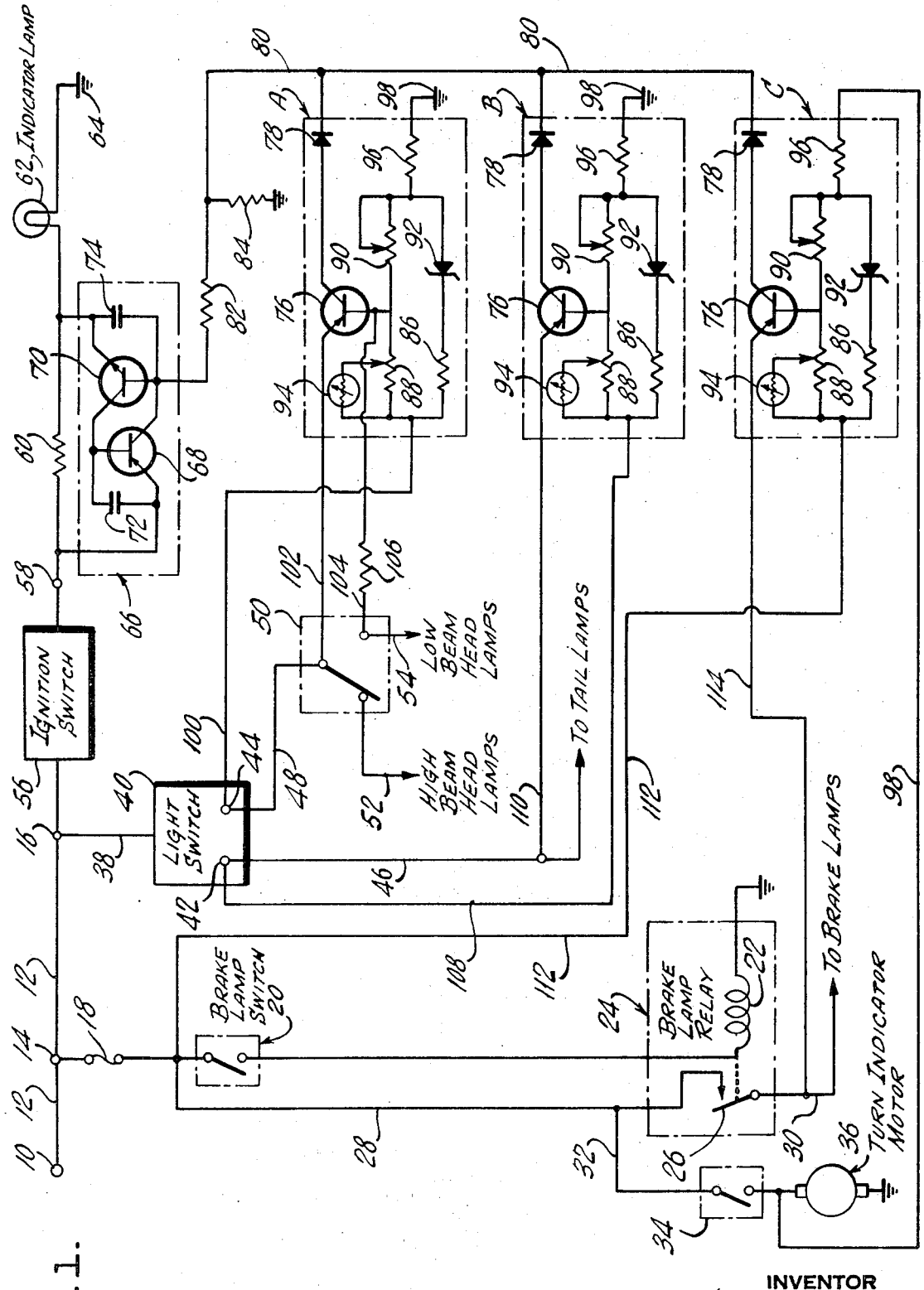

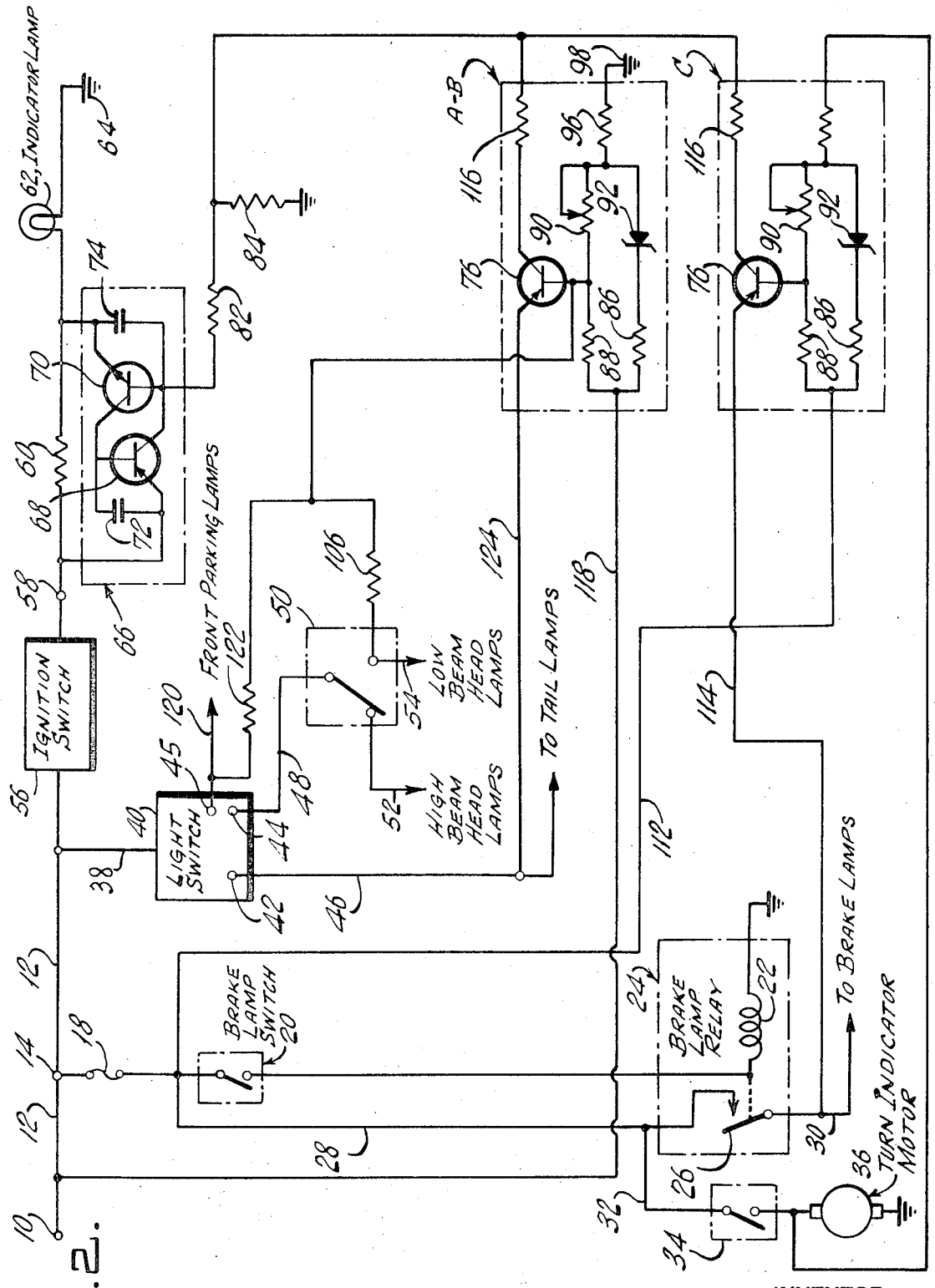

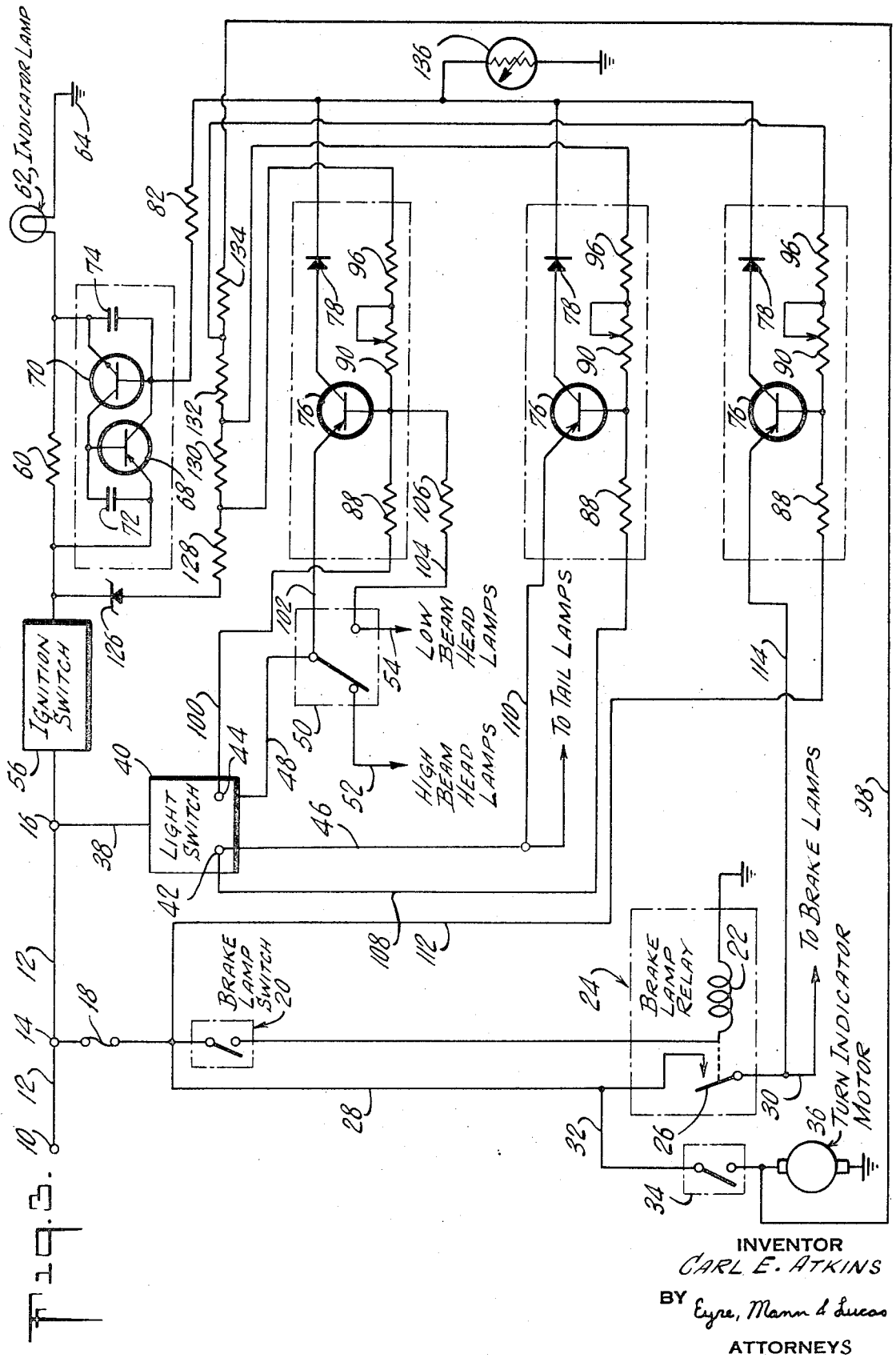

LAMP OUTAGE INDICATOR

The present invention provides a lamp outage indicator for indication of a failure of any running lamp, i.e., any brake, parking, tail or headlamp of an automotive vehicle. This application is a continuation-in-part of a copending application, Ser. No. 591,529 filed Nov. 2, 1966, and now abandoned.

The invention is characterized by solid-state, low-level sensing circuitry which uses as inputs the voltage drops across the wiring connecting the various lamp groups to the light switch and to the voltage source. The voltage drops across these wires may vary anywhere from about 80 millivolts to 600 millivolts. A representative value of variation in these voltages in response to which the sensing circuit produces an output is 45 millivolts, which is the approximate decrease in input voltage resulting from the failure of a single lamp.

In accordance with the present invention, a load to be monitored is connected in a first current path. An indicator with an associated control switch is connected in a second current path and at least one sensing amplifier is connected in a third current path. The sensing amplifier is connected to the first current path to drive an input signal which causes an increase in the output current of the sensing amplifier upon a change in the monitored load. The output current of sensing amplifier is conducted to the control switch in the second current path which actuates the indicator to show a change in the monitored load.

The sensing circuit disclosed herein has this advantage over certain prior art devices, that it is connected in parallel with the monitored circuit rather than in series. Consequently, a failure in the sensing circuit cannot result in the monitored circuit being rendered inoperative, as is the case with series connected devices.

The circuit of the invention also has the advantage of automatically compensating for the fluctuations in line voltage prevalent in automobile electrical systems, and for the effects of variations in ambient temperature upon the circuit elements. Other advantageous features include inhibition of sensing cell operation upon operation of turn signals, and bias compensation for change in load in the monitored circuit.

These and other advantages and the details of preferred embodiments of the invention may be best understood by reference to the drawings in which:

FIG. 1 shows one embodiment of the invention.

FIG. 2 shows a more economical embodiment of the invention.

FIG. 3 shows an even more economical embodiment of the invention.

Referring to FIG. 1, reference numeral 10 designates a nominal 12-volt source of potential of an automotive vehicle. This source is connected through conductor 12 to terminals 14 and 16. Terminal 14 is connected through fuse 18 to a foot-operated brake lamp switch 20 which, when closed, completes a circuit through the coil 22 of a relay 24 to ground. Upon such energization of the relay 24, the armature 26 closes to provide a current path through conductors 28 and 30 to the brake lamps.

Conductor 32 connects conductor 28 to a turn signal indicator switch 34 which, when closed, completes a circuit through a turn signal indicator motor 36 to ground. The motor 36 causes multiple brake lamps to flash sequentially to indicate a direction of turn. Such a turn indication mechanism is used on certain luxury class automobiles and the details thereof are not shown in the drawings since they form no part of the present invention.

Terminal 16 is connected through conductor 38 to a light switch 40 which completes circuits through the terminals 42 and 44. Terminal 42 is connected through conductor 46 to the tail lamps. Terminal 44 is connected through conductor 48 to a foot-operated dimmer switch 50 which switches the current path alternatively between conductor 52, leading to the high beam headlamps, and conductor 54, leading to the low beam headlamps.

Terminal 16 is also connected to the ignition switch 56 of the vehicle.

All of the foregoing constitutes well known elements of conventional lamp circuits or current paths in automotive vehicles.

In accordance with the invention, the ignition switch 56 is connected through terminal 58 and resistor 60 to an indicator lamp 62 which is grounded at 64 to complete the current path. Connected across the resistor 60 is a transistor switch 66 comprising two complimentary transistors 68 and 70 connected in the conventional regenerative feedback configuration. Capacitor 72 is connected across the emitter-base junction of transistor 68 and capacitor 74 is similarly connected across the emitter-base junction of transistor 70.

The FIG. 1 embodiment of the invention utilizes three sensing cells A, B and C which detect failure of any one or more of the above described brake, tail and headlamps of the automotive vehicle. Each of the cells A, B and C is substantially identical and consists of a sensing amplifier comprising a PNP transistor 76, the collector of which is connected through diode 78 to a common conductor 80 which is connected through resistor 82 to the base of transistor 70 in the transistor switch 66. A load resistor 84 provides a current path from conductor 80 to ground.

The base of transistor 76 in each cell A, B and C is connected to a bias circuit containing resistors 86, 88, 90, Zener diode 92, thermistor 94 and fixed resistor 96. The base of transistor 76 is connected to the junction between resistors 88 and 90.

One side of a temperature compensating thermistor 94 in the bias circuit of each sensing amplifier is tapped into resistor 88 and the other side of the thermistor is connected to the junction between resistors 86 and 88. The junction between resistor 90 and Zener diode 92 is connected to resistor 96 which is grounded at 98. The same arrangement is used in cell B but in cell C, resistor 96 is connected through conductor 98 to the junction between the turn signal indicator switch 34 and the turn signal indicator motor 36. This provides both a ground for the resistor 96 of cell C as well as an inhibition effect for cell C as will be more fully described hereinafter.

Cell A monitors the high beam and low beam headlamps and for this purpose is connected as follows. Conductor 100 connects the terminal 44 of light switch 40 to the junction between the resistors 86 and 88. Conductor 102 connects the common terminal of dimmer switch 50 to the emitter of transistor 76. Conductor 104 connects the conductor 54 for the low beam headlamps through resistor 106 to the base of transistor 76.

Cell B monitors the tail lamps and for this purpose is connected as follows. Conductor 108 connects terminal 42 of light switch 40 to the junction between resistors 86 and 88. Conductor 110 connects the conductor 46 for the tail lamps to the emitter of transistor 76.

Cell C monitors the brake lamps and for this purpose is connected as follows. Conductor 112 connects the junction between fuse 18 and brake lamp switch 20 to the junction between the resistors 86 and 88. Conductor 114 connects the conductor 30 for the brake lamps to the emitter of transistor 76.

As will be noted, the respective pairs of input conductors 100 and 102, 108 and 110, and 112 and 114, of each of the sensing cells A, B and C are connected across the lengths of the conductors 48, 46 and 28 connecting the various lamp groups to their respective switches. Upon failure of a lamp, the current in these conductors decreases due to the increase in net resistance of the remaining lamp load. This decrease in load current results in a smaller voltage drop across the length of the conductor connecting the lamp group to its switch, thereby causing the emitter of the transistor 76 in the associated sensing cell A, B or C to become more positive with respect to its base. The consequent increase in emitter-to-base current effects an increase in collector current, which causes an increased voltage drop across the load resistor 84. This increase in the output current in the current path of the sensing amplifier 76 places a positive bias on the respective base and collector of the NPN and PNP transistors 70 and 68 which renders the transistor switch 66 conductive. As a result, current is shunted past the resistor 60 to provide a greatly increased current through ignition switch 56 to the indicator lamp 62 to light the lamp and thereby indicate a lamp failure. Capacitors 72 and 74 are connected between emitter and base of each transistor to prevent the transistor switch 66 from being turned on by transient currents. Resistor 82 and capacitor 74 cause a time delay in rendering the transistor switch 66 conductive so that the momentary output of sensing cell A which occurs when switching from high to low beams (or vice versa) will not cause a false indication of lamp outage.

The aforesaid bias circuit in each sensing cell A, B and C is composed of two parallel branches, one comprising resistors 88 and 90 and thermistor 94, and the other comprising resistor 86 and Zener diode 92. These branches in combination with the resistor 96 maintain proper bias across the emitter-base junction of the transistors 76 in the sensing cells A, B and C regardless of fluctuation in line voltage. The fixed resistor 88 is at least partially paralleled by the thermistor 94 to alter the emitter-to-base bias with variations in temperature.

The Zener diode 92 breaks down under the impressed line voltage and provides a drop of approximately 6 volts across its terminals, which remains substantially constant regardless of current flow. The small resistance 86 in series with the Zener diode causes the voltage drop across this branch to vary sufficiently with line voltage to keep the voltages across the resistors 88 and 90 in the other parallel branch and the resistor 96 at the proper level to maintain a substantially steady emitter-base bias, thereby maintaining a steady negligible collector current. The variable resistor 90 enables adjustment of the base bias level.

It is apparent that there will be a large variation in the current in conductor 48 of the headlamp circuit when switching from high beam operation to low beam operation due to the higher resistance of the low beam lamps. To compensate for the resulting variation in the voltage detected by the associated sensing cell A, a resistor 106 of suitable value is connected between the base of the transistor 76 and the conductor 54 supplying the low beam headlamps. Thus, when switch 50 is operated to change from high to low beam operation, the base of the transistor 76 is made more positive with respect to ground as a result of decreased current flow through the variable resistor 90 to ground. This compensates for the increase in voltage from emitter to ground caused by the decrease in load current when the current path is switched from the high beam headlamps to the low beam headlamps.

In order to prevent a false indication of lamp failure, a very simple and inexpensive technique has been devised to inhibit operation of the sensing cell C associated with the brake lamp circuit. The ground connection for cell C is made through the turn signal indicator motor 36. Thus, when switch 34 is closed to operate turn signal indicator motor 36, the voltage across the bias circuitry of the cell C is negligible since the voltage on the ungrounded side (conductor 112) is essentially at line voltage, and the voltage on the grounded side (conductor 98) is the line voltage less the voltage drop between the source 10 and the switch 34. Hence, the base of the transistor 76 in cell C is very nearly at line voltage which prevents any significant current flow from emitter to base and thereby prevents any significant collector current from flowing. As a result, the transistor switch 66 will not be turned on and the indicator lamp 62 will not light. When the turn signal indicator motor 36 is inoperative, the ground connection of cell C is completed through the conductor 98 and the low armature resistance of the motor.

It will be noted that the sensing cells B and C associated with the headlamp and tail lamp circuits can be modified to operate with bias circuits having a common Zener diode-resistor branch 92, 86 since the ungrounded side of each bias circuit is always at line potential and the grounded side is always at ground potential. The bias circuit of the sensing cell C associated with the brake lamp circuit cannot be similarly modified to operate with a common voltage-regulating branch because the grounded side of the bias circuit of cell C is nearly at line potential when the turn signal indicator motor 36 is operating.

The forward biased diodes 78 in FIG. 1 have two functions. When one or more sensing cells are deenergized as, for example, when the headlamps and tail lamps are off, the diodes 78 in the deenergized cells prevent the output of an operative cell (e.g., of cell C) from being shunted through the transistors 76 of the deenergized cells A and B to ground. The diodes 78 also reduce the small output of the sensing cells A, B and C under normal load conditions, i.e., when no lamps have failed, and thereby minimize the possibility of the outputs of the several cells from combining to turn on the transistor switch 66.

A more economical embodiment of the invention is shown in FIG. 2. In this embodiment, the number of sensing cells is reduced from three to two, designated A-B and C, the thermistor 94 is omitted from the bias circuit of each cell, and a resistor 116 supplants the diode 78 in the output circuit of each sensing cell. These modifications effect a substantial saving in the total cost of the unit at only a small sacrifice in performance.

The multiple function cell A-B is capable of monitoring tail lamps, front parking lamps, and headlamps on both high and low beam settings. The line side of the bias circuit for the cell A-B is connected through conductor 118 to the voltage source 10 instead of to a terminal of light switch 40 as in FIG. 1. As before, the conductor 54 for the low beam headlamps is connected through resistor 106 to the base of transistor 76. A third terminal 45 of light switch 40 provides a circuit through conductor 120 to the front parking lamps. This conductor 120 is connected through resistor 122 to the base of transistor 76 in the sensing cell A-B. Conductor 46 for the tail lamps is connected by conductor 124 to the emitter of transistor 76 in sensing cell A-B. The removing parts and connections in FIG. 2 are the same as in FIG. 1.

Thus, it is to be noted that the three load circuits connected to the terminals 42, 44 and 45 of the light switch 40 share the conductor segments 12 and 38. Therefore, although the emitter of transistor 76 is connected to the tail lamp conductor 46, the cell A-B can sense load changes in the headlamp and front parking lamp circuits, as well as the tail lamp circuit, by sensing the voltage drop across the conductor segments 12 and 38 connecting the voltage source 10 to the light switch 40 and across the light switch 40 and the conductor 46 connecting the switch 40 to the tail lamps. Since the front parking lamps and the headlamps are never on at the same time, only two circuits are monitored simultaneously, either the tail lamp and parking lamp circuits or the tail lamp and headlamp circuits. When the tail lamps and high beam headlamps are on, the bias on the base of the transistor 76 of cell A-B is adjusted by means of the variable resistor 90 so that collector current is minimal. Failure of a lamp in either circuit will cause a decrease in current flowing from the voltage source, resulting in a net voltage decrease across the conductor segments 12 and 38, switch 40 and conductor 46 connecting the tail lights with the voltage source. This voltage decrease is sensed by the cell and causes the indicator lamp 62 to light in the manner described earlier for FIG. 1. When the low beam dimmer switch 50 is operated to change the load, i.e., to go from high beam to low beam, there is a decrease in current in the headlamp circuit (including the wiring 48) not resulting from a lamp failure. Resistor 106 prevents a false lamp outage indication by altering the potential at the base of transistor 76 in the same manner as in the circuit shown in FIG. 1.

When the tail lamps and front parking lamps are on, again the current from the voltage source will be less than when the tail lamps and headlamps are on, and again compensation is made for the consequent change in emitter potential of transistor 76 with respect to ground by effecting a like change in base potential by means of resistors 122 and 106. These resistors are now series connected from the light switch terminal 45 (very nearly at full line voltage) to ground through the low beam headlamps. The value of resistor 106 is dictated by the bias compensation requirements of low beam headlamp and tail lamp operation. The value of resistor 122 is chosen so as to provide the required potential at the junction with resistor 106 when the parking lamps and tail lamps are on.

FIG. 3 shows another economical embodiment of the invention. In this embodiment, the Zener diode-resistor branch 86, 92 in the bias circuitry of each cell A, B and C has been replaced by a single Zener diode 126 and four resistors 128, 130, 132 and 134 connected in series between line and ground. Also, instead of employing a thermistor in each cell, a single thermistor 136 is used in place of the load resistor 84 of FIG. 1.

As the output of the cells A, B and C increases as a result of increase in ambient temperature, the resistance of thermistor 136 decreases, thereby providing a low-resistance path to ground as compared to the path through resistor 82, the transistor switch 66, and indicator lamp 62. Thus, the transistor switch 66 is prevented from being turned on by thermally-generated output current.

The Zener diode 126 has a constant voltage drop from cathode to anode of approximately 10 volts. The difference between line voltage and the drop across the Zener diode 126 is distributed across the resistors 128, 130, 132 and 134. The branches of the regulating circuits of cells A, B and C comprising resistors 88, 90 and 96 are connected at different points in the common Zener diode-resistance branch because different degrees of voltage regulation are necessary in each sensing cell A, B and C in order to maintain a substantially constant output as a function of line voltage. This constant output is achieved by maintaining a constant bias voltage across the emitter-base junction of transistor 76. Essentially, the emitters of the transistors 76 are connected between two resistances, i.e., the resistance of the various conductors connecting the voltage source to the respective loads and the resistance of the loads. The voltage from line to ground is divided by these two resistances. As line voltage fluctuates, there will be a proportionate fluctuation in emitter-to-ground potential. To maintain the bias voltage across the emitter-base junctions of transistors 76 constant, there must be an equal fluctuation in base-to-ground potential, i.e., the base-to-ground potential must "track" the emitter-to-ground potential so as to maintain a constant differential therebetween under normal load conditions in the monitored circuits.

This is accomplished by providing varying degrees of voltage regulation in the bias circuitry of each of the sensing cells, A, B and C, i.e., the voltage across the resistive branch of the bias circuitry (comprising resistors 88, 90 and 96) for the transistors 76 is imperfectly regulated by the common branch comprising the Zener diode 126 and resistors 128, 130, 132 and 134. The fluctuating voltages provided by the common Zener diode-resistance branch are divided by resistors 88, 90 and 96 and, together with the potential to ground from the point of connection of resistors 96 to the Zener diode-resistance branch, provide the base-to-ground potentials for the transistors 76. The different points of connection of resistors 96 to the resistors 128, 130, 132 and 134 provide varying degrees of voltage regulation to the bias circuits of cells A, B and C. The higher the percentage of total resistance formed by the load resistance in a monitored circuit, the less perfect the voltage regulation that will be necessary to have the base-to-ground potential track the emitter-to-ground potential.

It will be noted that, when a cell is inoperative, resistors 90 and 96 in the inoperative cells prevent any significant current flow across the low-resistance base-collector junction of transistor 76.

The ground connection of the Zener diode-resistance branch 126, 128, 130, 132 and 134 is made through the armature of the turn signal indicator motor 36. This has the effect of inhibiting operation of all the sensing cells whenever the turn signal indicator motor is energized, since the bases of the transistors 76 are very nearly at full line voltage. Thus, the fluctuating load in the brake light circuit being monitored by cell C is prevented from causing a false lamp outage indication. The simultaneous temporary inhibition of operation of the other sensing cells A and B is no real disadvantage since the operator of a motor vehicle presumably would not be watching the instruments while making a turn.

What is claimed is:

1. A monitoring circuit for detecting and signaling an increase in resistance in a load comprising:
   a. at least one first current path including at least one conducting lamp load to be monitored,
   b. a second current path including a switch and an indicating means, said switch being normally in a substantially non-conductive condition to maintain said indicating means in a de-energized state,
   c. at least one third circuit path including at least one sensing amplifier conducting at all times when the load to be monitored should be conducting,
   d. said sensing amplifier being connected to said first current path to derive an input signal to cause an increase in output current upon an increase in the resistance of said load in said first current path, and
   e. said sensing amplifier also being connected to said switch to render the switch conductive and energize said indicator means upon an increase in said output current.

2. A monitoring circuit as specified in claim 1 wherein said sensing amplifier includes bias voltage regulating means for maintaining the input bias to said sensing amplifier substantially constant during line voltage fluctuations.

3. A monitoring circuit as specified in claim 1 wherein the said connection between the sensing amplifier and switch includes inhibiting means for minimizing the output of said sensing amplifier to prevent actuation of said switch under normal operating conditions and for permitting a sufficiently large increase in output when the resistance in said load increases to render said switch conductive and thereby energize said indicator means.

4. A monitoring means as specified in claim 1 wherein said switch includes two transistors, each having its base electrode coupled to the collector electrode of the other transistor, said switch having output terminals which present a high resistance therebetween when said switch is non-conductive and a low resistance therebetween when said switch is rendered conductive.

5. A monitoring means as specified in claim 1 wherein said sensing amplifier includes a transistor, and bias voltage regulating means which include:
   a. a first fixed resistor and a variable resistor connected in series, the base of said transistor being connected between said first and said variable resistor,
   b. a second fixed resistor and a Zener diode connected in series with each other and in parallel with said first fixed resistor and variable resistor, and
   c. a third fixed resistor connecting said resistors and Zener diode to ground.

6. A monitoring circuit as specified in claim 2 wherein said bias voltage regulating means include thermistor means which controls the flow of current to substantially prevent a thermally generated output from said sensing amplifier.

7. A monitoring circuit as specified in claim 1 wherein said first current path includes an electro-mechanical means associated with at least one load to be monitored, and wherein said third circuit path has a normal ground connection and a connection to an ungrounded terminal of the electro-mechanical means, said normal ground connection being at line potential when said electro-mechanical means is operative to produce normal fluctuations in the resistance of said load.

8. A monitoring circuit for detecting and signaling an increase in resistance in a load comprising:
   a. at least one first current path including at least two conducting loads to be monitored, wherein each of at least two loads has a different resistance value;
   b. a second current path including a switch and an indicating means, said switch being normally in a substantially non-conductive condition to maintain said indicating means in a de-energized state;
   c. at least one third circuit path including at least one sensing amplifier, said third circuit path including a single sensing amplifier for at least the two loads of different resistance value and said at least one sensing amplifier conducting at all times when the loads to be monitored should be conducting;
   d. each said sensing amplifier being connected to said first current path to derive an input signal to cause an increase in output current upon an increase in the resistance of any one of said loads in said first current path;
   e. each said sensing amplifier also being connected to said switch to render the switch conductive and energize said indicator means upon an increase in said output current;
   f. said single sensing amplifier including bias voltage regulating means for maintaining the input bias to said sensing amplifier substantially constant during line voltage fluctuations; and
   g. said bias voltage regulating means including compensating means for maintaining the input bias to said sensing amplifier substantially constant for each different resistance value of said loads.

* * * * *